US011060359B2

(12) United States Patent
Scekic et al.

(10) Patent No.: US 11,060,359 B2
(45) Date of Patent: Jul. 13, 2021

(54) POLISHED ROD ROTATOR WITH HEIGHT ADJUSTER

(71) Applicant: 1914415 ALBERTA LTD, Calgary (CA)

(72) Inventors: Vladimir Scekic, British Columbia (CA); Todd McCorriston, Calgary (CA); Craig Simmers, Breton (CA)

(73) Assignee: 1914415 ALBERTA LTD, Alberta (CA)

( * ) Notice: Subject to any disclaimer, the term of this patent is extended or adjusted under 35 U.S.C. 154(b) by 0 days.

(21) Appl. No.: 16/832,435

(22) Filed: Mar. 27, 2020

(65) Prior Publication Data

US 2020/0284105 A1    Sep. 10, 2020

Related U.S. Application Data

(63) Continuation of application No. 15/564,832, filed as application No. PCT/CA2016/050311 on Mar. 18, 2016, now Pat. No. 10,605,014.

(Continued)

(51) Int. Cl.
*E21B 43/12* (2006.01)
*F04B 47/02* (2006.01)
(Continued)

(52) U.S. Cl.
CPC ............ *E21B 19/06* (2013.01); *E21B 43/127* (2013.01); *F04B 47/02* (2013.01); *F04B 47/026* (2013.01);
(Continued)

(58) Field of Classification Search
CPC ..... E21B 43/127; F04B 447/02; F04B 47/026
See application file for complete search history.

(56) References Cited

U.S. PATENT DOCUMENTS 2,030,282 A    2/1936 Cummins
2,114,090 A    4/1938 Van Stone
(Continued)

FOREIGN PATENT DOCUMENTS

CA    2517919    2/2007
CN    2475848    2/2002
(Continued)

OTHER PUBLICATIONS

International Search Report and Written Opinion for International (PCT) Patent Application No. PCT/CA2016/050311, dated May 28, 2016, 8 pages.

(Continued)

*Primary Examiner* — Giovanna Wright
(74) *Attorney, Agent, or Firm* — Sheridan Ross P.C.

(57) ABSTRACT

Apparatus and methods are provided for rotating the sucker rod strings of pumping equipment and adjusting the vertical position of the sucker rod string. The apparatuses can include a threaded tubular rod carrier or spindle and a polished rod can run through the rod carrier. The rod carrier can be held in place along the rod with a locking mechanism on the upper and lower ends of the rod carrier. A rotator can surround the rod carrier, and the rotator can include a wheel and a main thrust bearing, the wheel being in threaded connection with the threads of the rod carrier and supported by the main thrust bearing. The rotation of the wheel relative to the rod carrier can result in vertical movement of the rod and the vertical movement of the rod can be accomplished without disengaging the means for fixing the rod carrier to the rod.

11 Claims, 13 Drawing Sheets

Related U.S. Application Data

(60) Provisional application No. 62/144,618, filed on Apr. 8, 2015.

(51) Int. Cl.
*E21B 19/06* (2006.01)
*F16H 25/24* (2006.01)
*F16H 25/20* (2006.01)

(52) U.S. Cl.
CPC ........ *F16H 25/2454* (2013.01); *E21B 43/126* (2013.01); *F16H 2025/209* (2013.01)

(56) References Cited

U.S. PATENT DOCUMENTS

| | | |
|---|---|---|
| 2,311,816 A | 2/1943 | Collins |
| 2,862,394 A | 12/1958 | Lee |
| 2,886,975 A | 5/1959 | Murray |
| 3,675,514 A | 7/1972 | Walker |
| 6,026,898 A | 2/2000 | Bland et al. |
| 10,605,014 B2 * | 3/2020 | Scekic ............... F04B 47/02 |
| 2004/0154791 A1 | 8/2004 | Adoline |
| 2010/0037716 A1 | 2/2010 | Rolan |

FOREIGN PATENT DOCUMENTS

| | | |
|---|---|---|
| EP | 3280871 | 2/2018 |
| RU | 2178835 | 1/2002 |

OTHER PUBLICATIONS

Official Action for U.S. Appl. No. 15/564,832, dated May 13, 2019, 18 pages.
Official Action for U.S. Appl. No. 15/564,832, dated Oct 3, 2019, 6 pages.
Notice of Allowance for U.S. Appl. No. 15/564,832, dated Nov. 15, 2019, 6 pages.
Extended European Search Report for European Patent Application No. 18775973.7, dated Oct. 5, 2018, 8 pages.
Decision to Grant European Patent Application No. 16775973.7, dated Nov. 5, 2020, 2 pages.

* cited by examiner

POLISHED ROD ROTATOR WITH HEIGHT ADJUSTER

CROSS REFERENCE TO RELATED APPLICATIONS

This application is a continuation of U.S. patent application Ser. No. 15/564,832, filed Oct. 6, 2017, now U.S. Pat. No. 10,605,014, which is a national stage application under 35 U.S.C. 371 and claims the benefit of PCT Application No. PCT/CA2016/050311 having an international filing date of Mar. 18, 2016, which designated the United States, which PCT application claimed the benefit of U.S. Provisional Application No. 62/144,618 filed Apr. 8, 2015, the disclosure of each of which are incorporated herein by reference.

TECHNICAL FIELD

The present disclosure is related to the field of oil wells and wellhead equipment, and more particularly to oil wells where extraction is carried out by using pumping equipment with reciprocating sucker-rods.

BACKGROUND

During oil well operation, a bottom-hole pump is typically actuated by a string of sucker rods; the uppermost rod is known as the polished rod or polish rod. To accomplish the pumping action from the well, reciprocating motion is provided to the sucker rod string by suspending the polish rod from a rocking beam by means of a suitable hanger.

The vast majority of oil wells have deviations from the vertical axis. Therefore, reciprocating motion of the sucker rod string in wells results in uneven wearing of both the sucker rods and well tubing. Intermittent rotating action (usually clockwise direction looking down the well) can be provided by a rod rotator to rotate the sucker rod string, resulting in a more even wearing of the sucker rods and well tubing. Further, this rotation can prevent unwanted unscrewing of rods and, when used in conjunction with rod scrapers, can reduce the build-up of wax and paraffin on the surfaces of tubing and sucker rods.

A polished rod is typically supported by a thrust bearing within the rotator by the means of a polished rod clamp. The clamp is used to create a friction connection with the polished rod and prevent it from moving downwards through the cylindrical opening in the rod rotator.

Vertical positioning adjustment between the string and the hanger is necessary from time to time. However, this is only possible by repositioning the polished rod clamp on the polished rod.

Unlike the reciprocating and rotary movements, which have been subject to numerous technological advancements over time, the vertical positioning adjustment has received little attention. The operation of a vertical positioning adjustment is a technically challenging operation requiring a high degree of skill. It also carries a significant amount of risk due to the possibility of failure of the friction connection between the polished rod clamp and polished rod, which can result in the polished rod, and the sucker rod string, falling downhole and leading to damage of the downhole equipment.

Accordingly, there is need to provide a method and apparatus that can overcome the short-comings of the prior art with respect to vertical height adjustment. More particularly, an apparatus is needed that can provide an improved method of vertically restraining the polished rod while offering convenient and safe vertical positioning adjustment of the sucker rod string.

SUMMARY

Apparatus and methods are provided for rotating sucker rod strings of pumping equipment and adjusting the vertical position of the sucker rod string. In some embodiments, the apparatus can include a tubular rod carrier or spindle, which can be threaded on its external surface. A polished rod can run through the rod carrier. In some embodiments, the rod carrier can be held in place along the polished rod with a locking mechanism, for example, by taper lock bushings or standard polished rod clamps, on the upper and lower ends of the rod carrier.

Broadly stated, in some embodiments, an apparatus is provided for adjusting the vertical position of a polished rod of a pump, the apparatus comprising: a tubular rod carrier for receiving the polished rod therethrough, the rod carrier having external threads; means for fixing the rod carrier to the polished rod; and a rotator surrounding the rod carrier, the rotator comprising a wheel and a main thrust bearing, the wheel being in threaded connection with the external threads of the rod carrier and supported by the main thrust bearing; wherein the rotation of the wheel relative to the tubular rod carrier results in vertical movement of the polished rod and wherein the vertical movement of the polished rod is accomplished without disengaging the means for fixing the rod carrier to the polished rod.

Broadly stated, in some embodiments, a rotation unit can be positioned along the threaded rod carrier. In some embodiments, the rotation unit can comprise a worm wheel threaded to the rod carrier. A worm can be configured to intertwine with the worm wheel and a lever can be positioned proximate one end of the worm so that adjustment/swinging of the lever can result in rotation of the polished rod.

In some embodiments, the wheel is a worm wheel engaged by a worm. In some embodiments, the means for fixing the rod carrier to the polished rod comprises a locking mechanism. In some embodiments, the locking mechanism comprises a taper lock. In some embodiments, the locking mechanism comprises a polished rod clamp. In some embodiments, the apparatus further comprises an adjustment locking mechanism comprising a cross member to engage a support cable of pumping equipment. In some embodiments, the worm is functionally attached to a lever to allow an operator to rotate the worm using the lever. In some embodiments, the rotator further comprises a ratchet mechanism positioned between the lever and the worm. In some embodiments, the rotator comprises an additional ratchet mechanism positioned proximate an end of the worm opposite of the lever. In some embodiments, the worm comprises a splined worm shaft. In some embodiments, the rotator comprises a casing to shelter the wheel. In some embodiments, the casing comprises a removable top cover.

Broadly stated, in some embodiments, a method is provided for adjusting the vertical position of a polished rod of a pump, the method comprising: releasing a locking mechanism between a rotator wheel and a rod carrier; holding the polished rod in place to prevent rotation of the polished rod around its vertical axis; and adjusting the vertical positioning of the polished rod by rotating the rotator wheel in a desired direction; wherein the polished rod and the rod carrier are not separated during the adjustment of the vertical positioning of polished rod.

Broadly stated, in some embodiments, a method is provided for adjusting the vertical position of the sucker rod string comprising: releasing a locking mechanism; using a back-up wrench or similar device to prevent rotation of polished rod; rotating the worm in the desired direction to adjust the vertical position of the polished rod. In some embodiments, the lever can also be used to adjust the height by flipping the lever along its longitudinal axis.

In some embodiments, adjusting the vertical positioning of polished rod is accomplished be rotating a worm within the rotator to rotate the rotator wheel threadedly engaged with the rod carrier. In some embodiments, the rotating of the worm is performed by an operator adjusting a lever, the lever being functionally attached to rotate the worm. In some embodiments, the adjusting of the lever comprises flipping the lever along its longitudinal axis to determine a direction of rotation. In some embodiments, the method further comprises the removal of a clutch from the rotator prior to rotating the worm. In some embodiments, a cross member is used to prevent rotation of the polished rod. In some embodiments, the cross member is extended to engage adjacent support cables to prevent rotation of the polished rod. In some embodiments, the method further comprises re-engaging the locking mechanism between the rotator and the rod carrier; once a new, desired, vertical position of polished rod has been achieved.

Broadly stated, in some embodiments, a rotator is provided for surrounding a rod carrier of an apparatus for adjusting the vertical position of a polished rod of a pump, the rotator comprising: a wheel and a main thrust bearing, the wheel being in threaded connection with external threads of the rod carrier and supported by the main thrust bearing; wherein the rod carrier receives the polished rod therethrough, and the apparatus comprises means for fixing the rod carrier to the polished rod; and wherein the rotation of the wheel relative to the rod carrier results in vertical movement of the polished rod and wherein the vertical movement of the polished rod is accomplished without disengaging the means for fixing the rod carrier to the polished rod.

In this way, the present disclosure describes apparatuses and methods for adjusting the vertical position of the sucker rod string without having to break the connection between the polished rod and the rod carrier while providing rotation to the polished rod.

DETAILED DESCRIPTION OF THE EMBODIMENTS

Apparatuses and methods are provided to rotate a string of reciprocating sucker rods of wellhead pumping equipment, where the apparatuses and methods can also provide convenient and safe vertical positioning adjustment of the sucker rod string.

Terms such as 'vertical', as used herein, are understood to mean approximate relative positions, and not words of precision.

In some embodiments, a tubular rod carrier, or spindle, can be fixed in a position on the polished rod. The rod carrier can have threads along its external surface. A rotation unit can be threaded on the rod carrier to provide intermittent rotation as desired. The position of the rotation unit on the rod carrier can be manipulated conveniently and safely. By utilizing the arrangements as described herein, it can become unnecessary to break the connection between the polished rod and the rod carrier to adjust the vertical position of the sucker rod string, as was required in prior art inventions.

Figure 1:
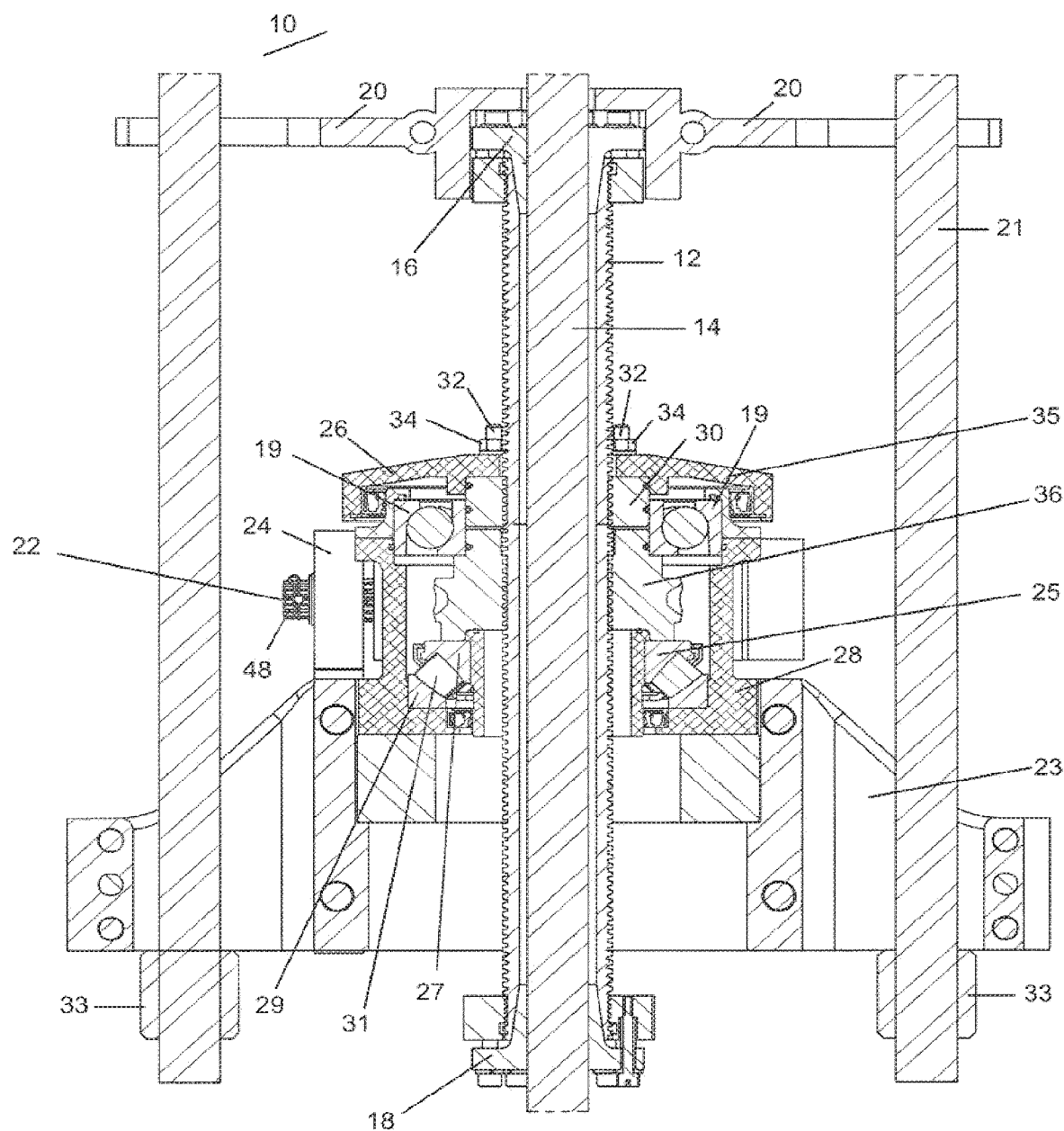
FIG. 1 is a side elevation, cross-section, view depicting an embodiment of an apparatus for rotating a string of sucker rods during the operation of pumping equipment and vertical height adjustment of the sucker rod string, the section plane being parallel to the worm axis.

Referring now to FIG. 1, apparatus 10 for rotating a polished rod 14 and adjusting the vertical position of polished rod 14 is shown. In some embodiments, apparatus 10 can comprise a tubular rod carrier 12, which can be threaded on its external surface. A polished rod 14 can pass through the rod carrier 12. In some embodiments, the position of the rod carrier 12 on the polish rod 14 can be maintained through the use of locking mechanisms, for example upper and lower taper-lock bushings 16, 18. During a vertical adjustment, a cross member 20, such as a back-up wrench or spare piping 55, can be positioned over the upper taper-lock bushing and contact support cables 21, in order to prevent free rotation of the rod carrier 12 and polish rod 14. However, those with ordinary skill in the art will understand that a plurality of other means may be used to ensure that the rod carrier 12 remains immovable with respect to the polished rod 14, a traditional polished rod clamp 15 and safety clamp 17 being included. Cross member 20 can be removable and/or absent during normal operation, when a vertical adjustment is not being made, therefore allowing free rotation of the rod carrier 12 and polish rod 14.

In some embodiments, rotator 35, surrounding rod carrier 12, can be supported by main crossbar 23, which can span between support cables 21, and can be supported by cable ends 33. Main crossbar 23 can be varied as desired. In some embodiments, main crossbar 23 can be configured to be reduced in volume, reduced in mass, and/or reduced in manufacturing cost.

Within rotator 35, wheel 36 can be supported by a main thrust bearing 25. In some embodiments, wheel 36 can be a worm wheel. Wheel 36 can also include a threaded core 56 for engaging and meshing with the external threads of rod carrier 12. In some embodiments, main thrust bearing 25 can comprise cone 27 and cup 29 components, as well as a cage and roller assembly 31. Main thrust bearing 25 can use spherical or tapered bearings, although it would be understood that functional equivalents could also be used.

Figure 2:
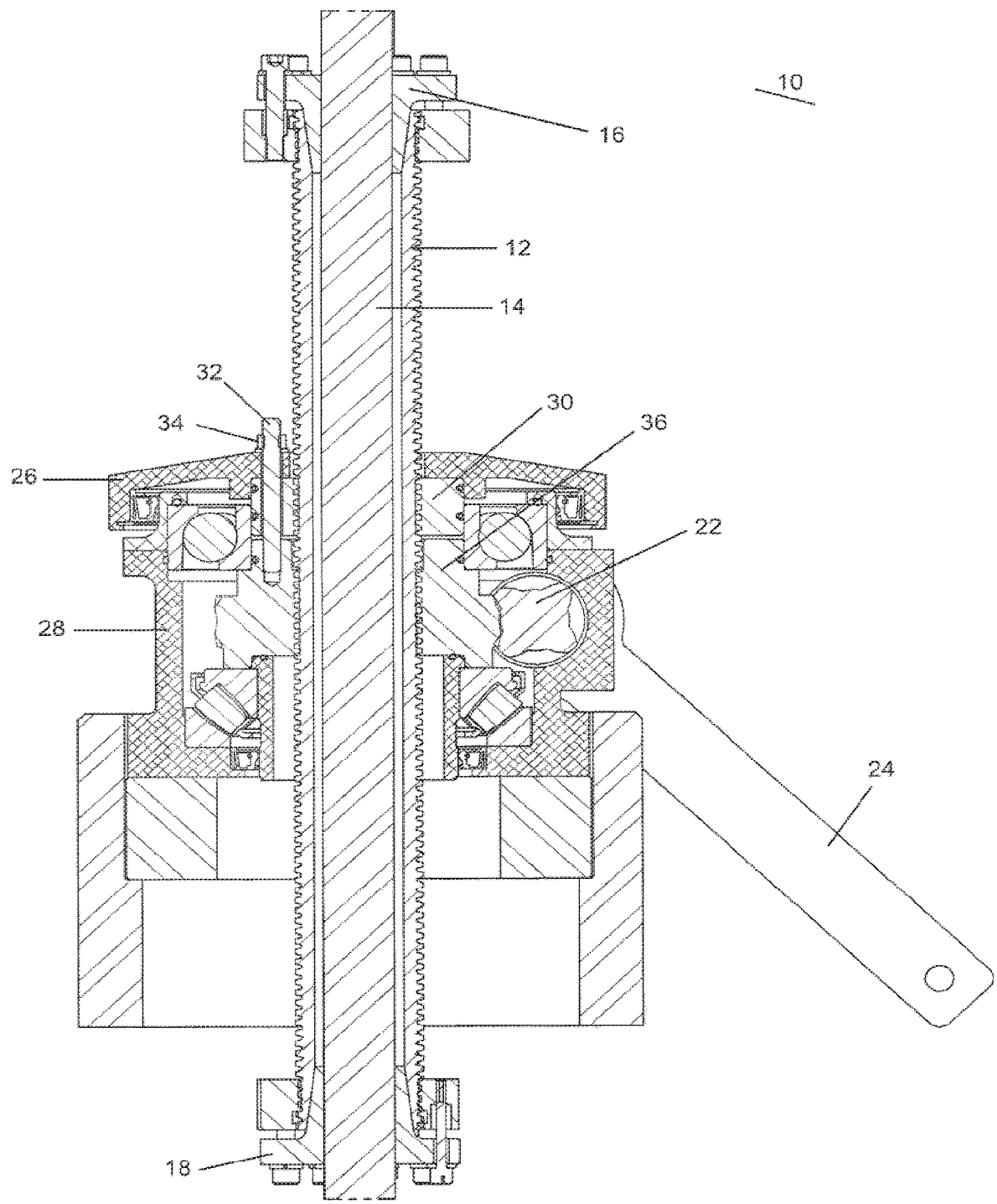
FIG. 2 is a partial, side elevation, cross-section, view of the embodiment shown in FIG. 1 with a lever, the section plane being perpendicular to the worm axis.

Referring now to FIG. 2, a lever 24 can be provided in the depicted embodiment that can provide for manual rotation of the rod carrier 12 and polish rod 14. In such an arrangement, the swinging moment of lever 24 can rotate worm 22. In some embodiments, the handle of lever 24 can include a hole to which a rope can be tied. In some embodiments, handle of lever 24 can also be labelled in a manner to reflect orientation of lever 24. Accordingly, when attaching lever 24, it is oriented in the proper direction.

In some embodiments, a top cover 26 can be provided over casing 28. A threaded spindle-locking nut 30 can be positioned between the worm wheel 36 and top cover 26. In some embodiments, spindle-locking nut 30 can be a separate component from worm wheel 36. In some embodiments, spindle-locking nut 30 can be integral with worm wheel 36

In some embodiments, a stud 32 can be positioned from worm wheel 36, through threaded spindle-locking nut 30 and through top cover 26. A nut 34 can be engaged with the upper portion of stud 32 through a threaded connection. In some embodiments, the locking action can be achieved by tightening the nut 34, which can further increases the friction in the threaded connection between the rod carrier 12 and threaded spindle-locking nut 30 thereby preventing unwanted movement between worm wheel 36 and rod carrier 12. Also, angular contact bearing 19 and main thrust bearing 25 can ensure the integrity of apparatus 10 is maintained during normal operation, during height adjustment, as well as during jarring, which is often induced in order to free stuck valves of downhole pumps. Those with ordinary skill in the art will understand that a plurality of other known locking solutions used in the industry and can be applied here.

Figure 3:
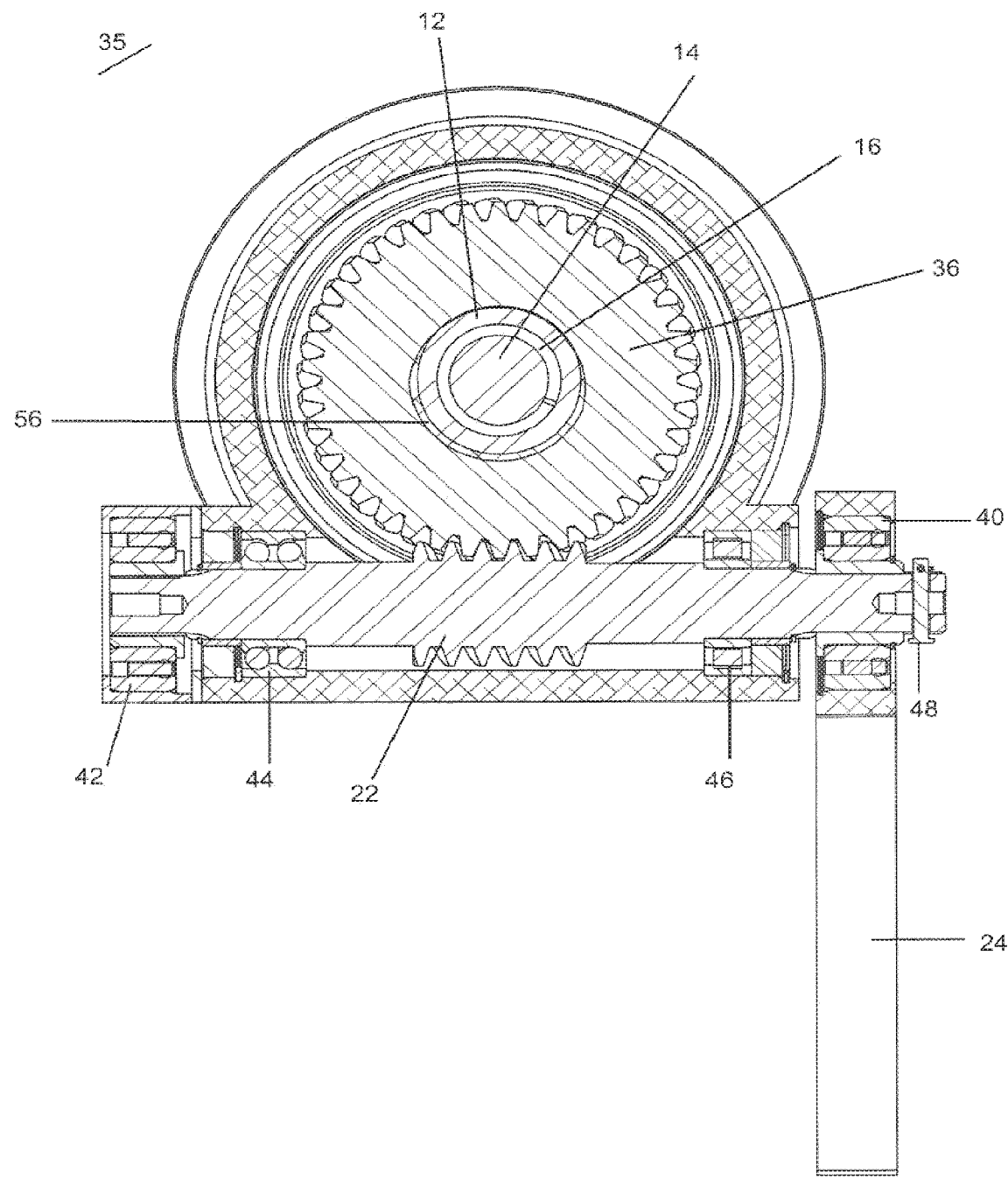
FIG. 3 is a partial, top, cross-section, view, of the embodiment of a rotator shown in FIG. 1, the section plane being through the worm axis and perpendicular to the polished rod axis.

Referring now to FIG. 3, in some embodiments, a worm wheel 36 is provided, which is shaped to be in meshing engagement with worm 22, said worm 22 being connected to the lever 24 by the means of a one-way clutch 40. In such an arrangement, the swinging movement of the lever 24 can produce one-way indexing rotation of the worm 22 and corresponding one-way indexing rotation of the worm wheel 36.

At the opposite end of the worm 22, some embodiments can include a polished rod one-way clutch 42 to prevent unwanted movement of the polished rod 14 in the counter-clockwise direction when looking down the well. Some embodiments can operate without polished rod one-way clutch 42, where the opposite end of the worm 22 can end in an engagement means 43, such as a male hex to be engaged by the operator using a tool (for example, a pneumatic tool, such as an air ratchet). Such means for engagement can also be in other forms, such as a female square, or other functional equivalents.

Those with ordinary skill in the art will understand that a plurality of different ratcheting mechanisms and/or one-way clutches can be used to accomplish the rotation of the polished rod and are not limited to the embodiments described herein.

In some embodiments, the apparatus 10 can include bearings 44, 46. These bearings can ensure geometrical positioning of the worm 22 with the worm wheel 36.

Figure 4:
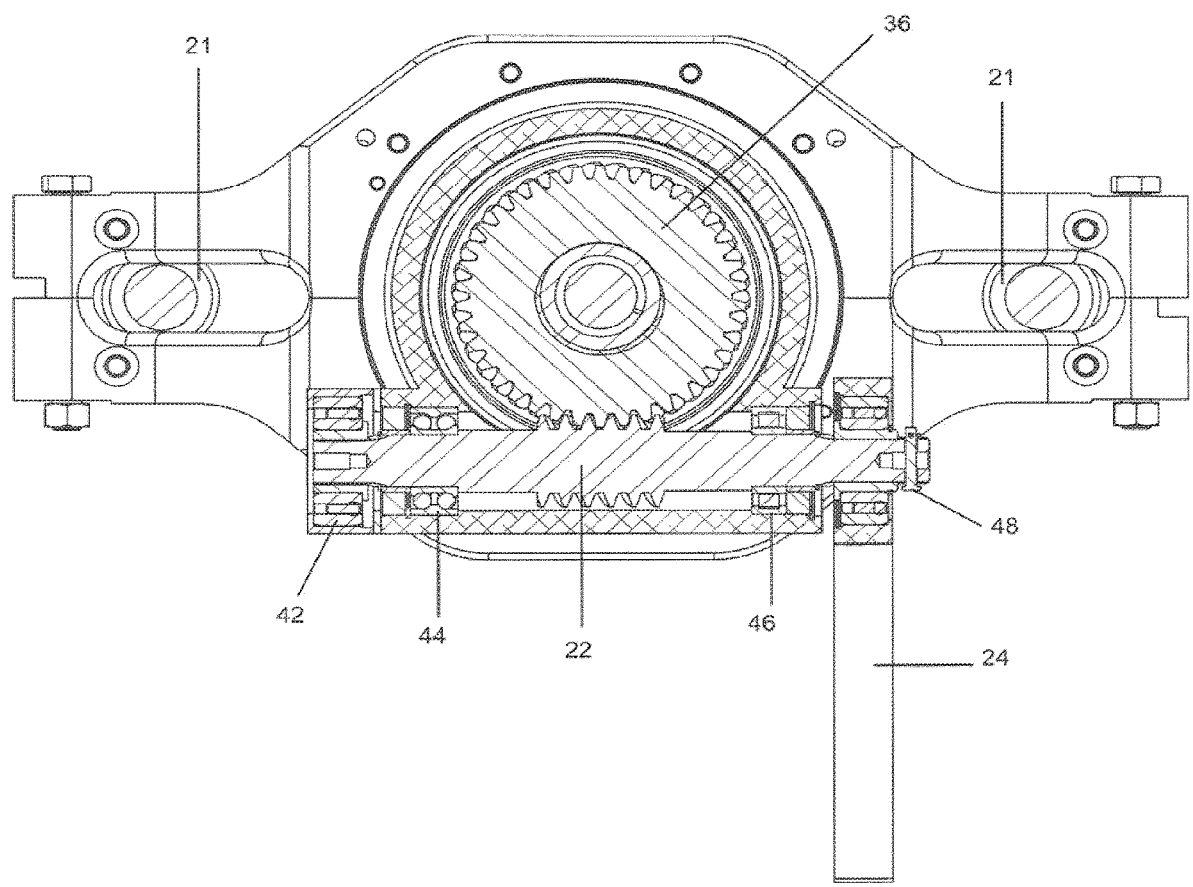
FIG. 4 is a top, cross-section, view, of the embodiment shown in FIG. 1.

FIG. 4 shows apparatus 10 in contact with support cables 21.

Figure 5:
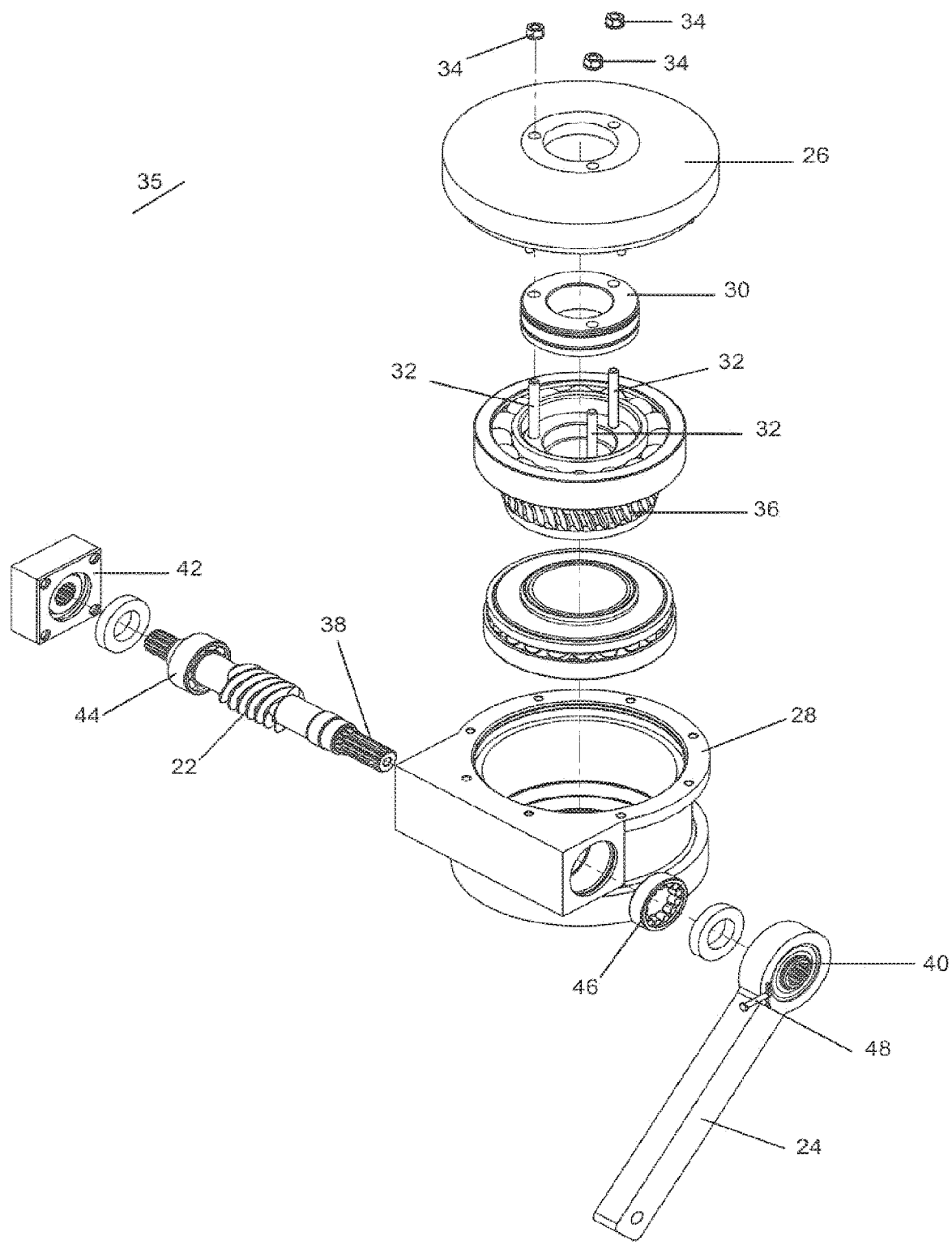
FIG. 5 is an exploded, perspective, view of the embodiment of a rotator shown in FIG. 1 in the absence of the rod and rod carrier.

Referring now to FIG. 5, an exploded view of a rotator 35 embodiment of apparatus 10 is shown. Some embodiments can also include splines on worm shaft 38 to keep it aligned in the rotational device and transfer rotational movement from the lever 24 to worm 22. A pin 48 can be included in some embodiments to keep the lever 24 in position at the end of the worm shaft 38. In these embodiments, the pin 48 can be removed so that the lever 24 can conveniently be taken off the end of the worm 22 and be repositioned.

Figure 6:
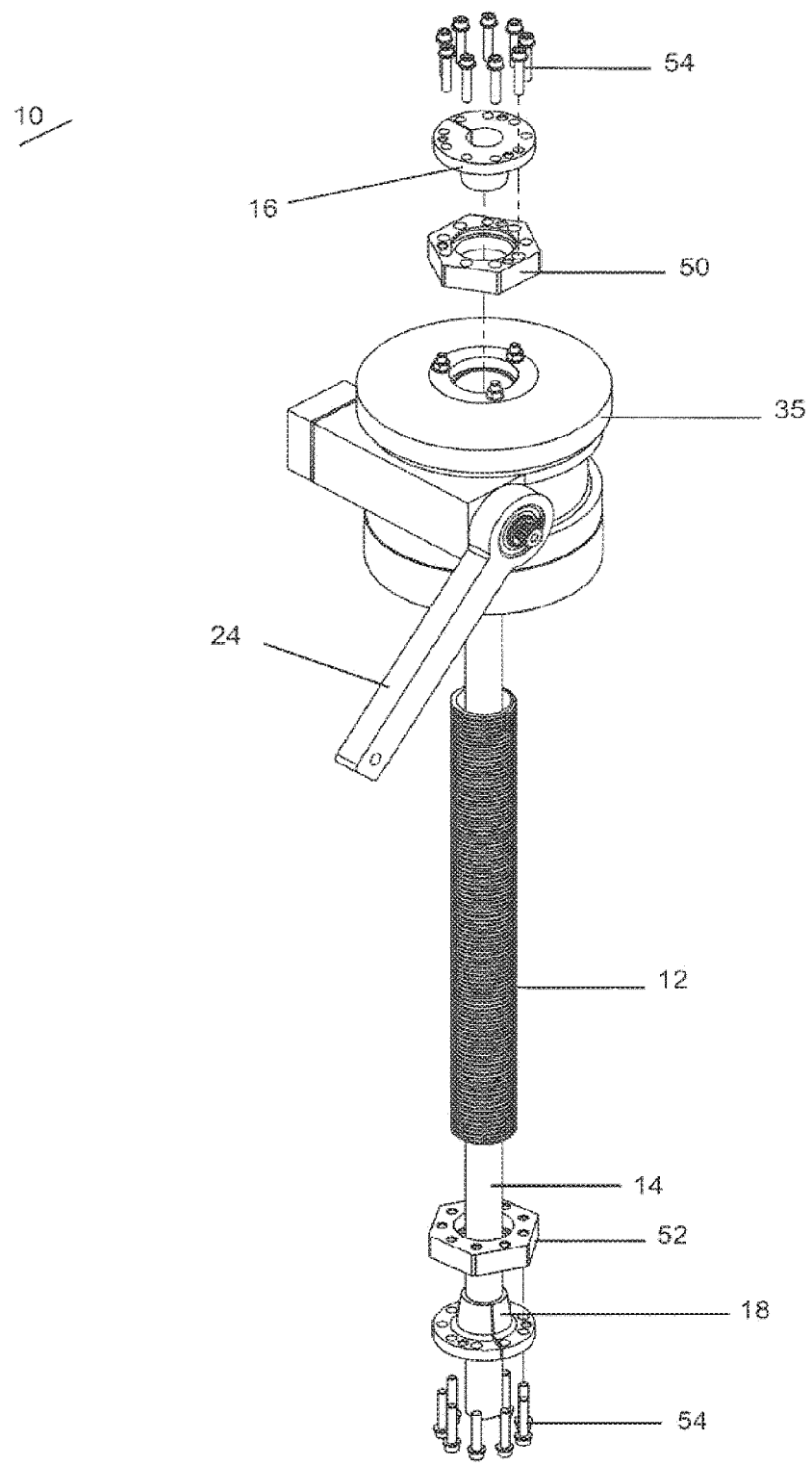
FIG. 6 is a partially exploded, perspective, view of the embodiment shown in FIG. 1, showing the rod and rod carrier.
Figure 7:
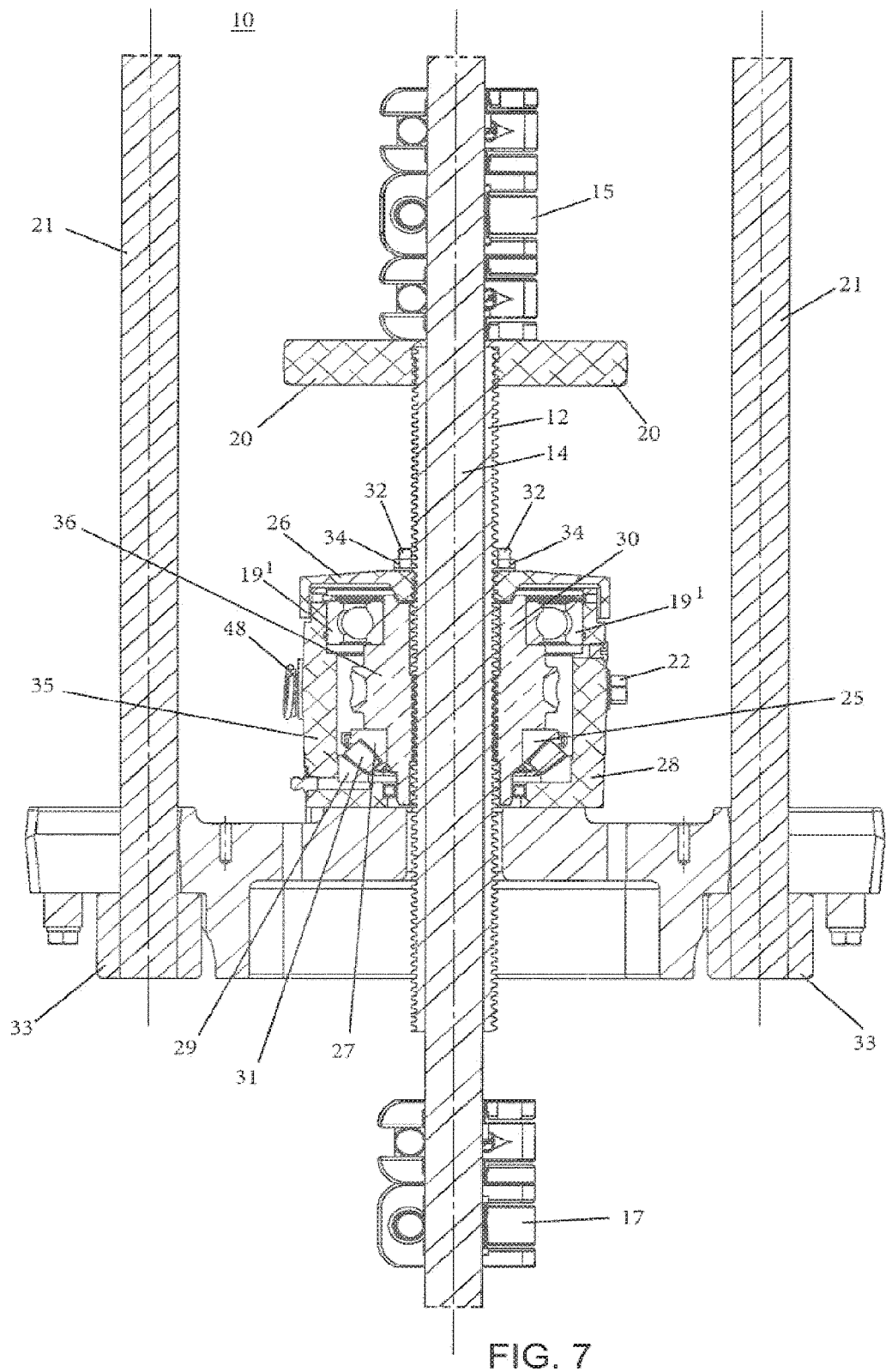
FIG. 7 is a side elevation, cross-section, view depicting an embodiment of an apparatus for rotating a string of sucker rods during the operation of pumping equipment and vertical height adjustment of the sucker rod string, the section plane being parallel to the worm axis.
Figure 8:
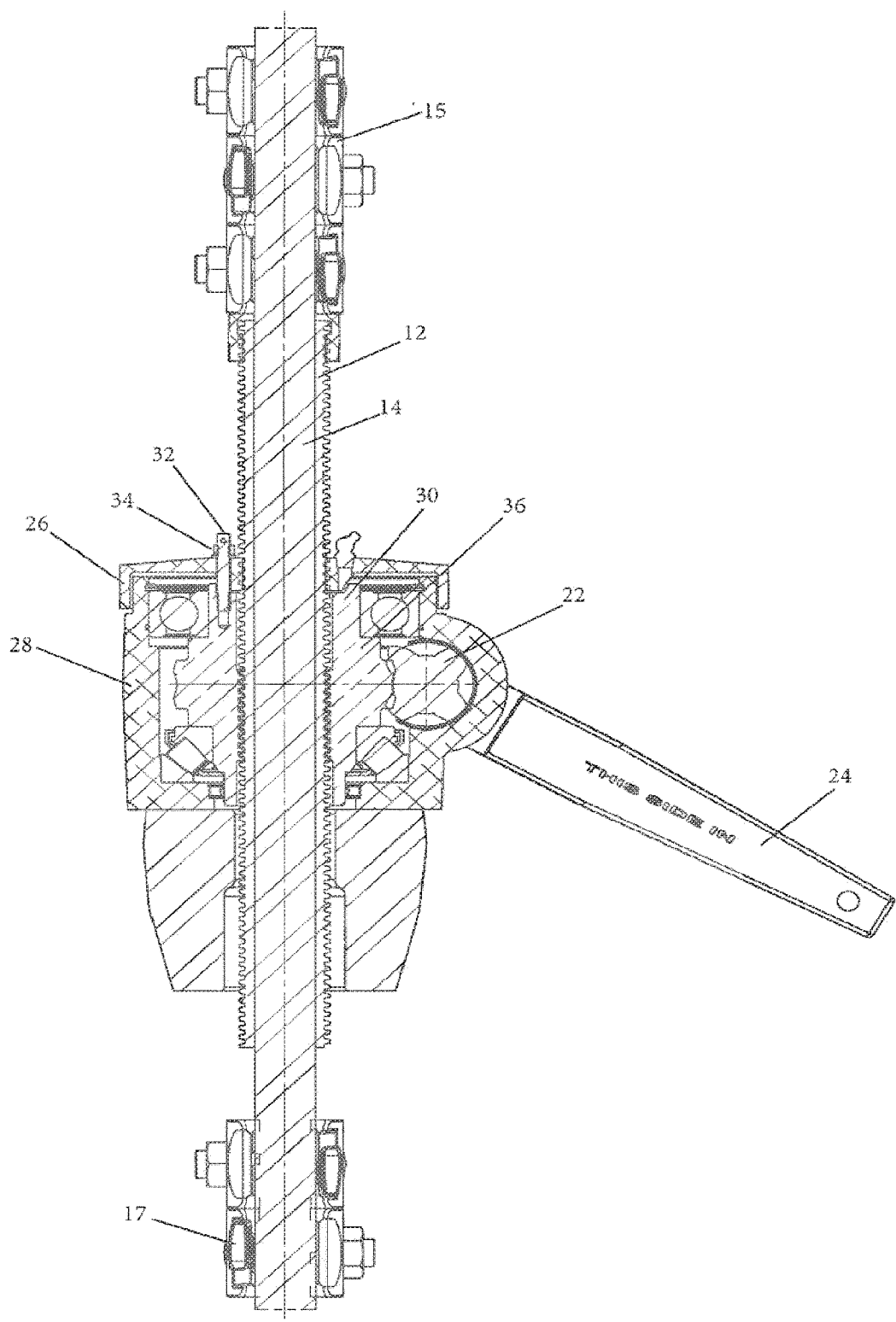
FIG. 8 is a partial, side elevation, cross-section, view of the embodiment shown in FIG. 7 with a lever, the section plane being perpendicular to the worm axis.
Figure 9:
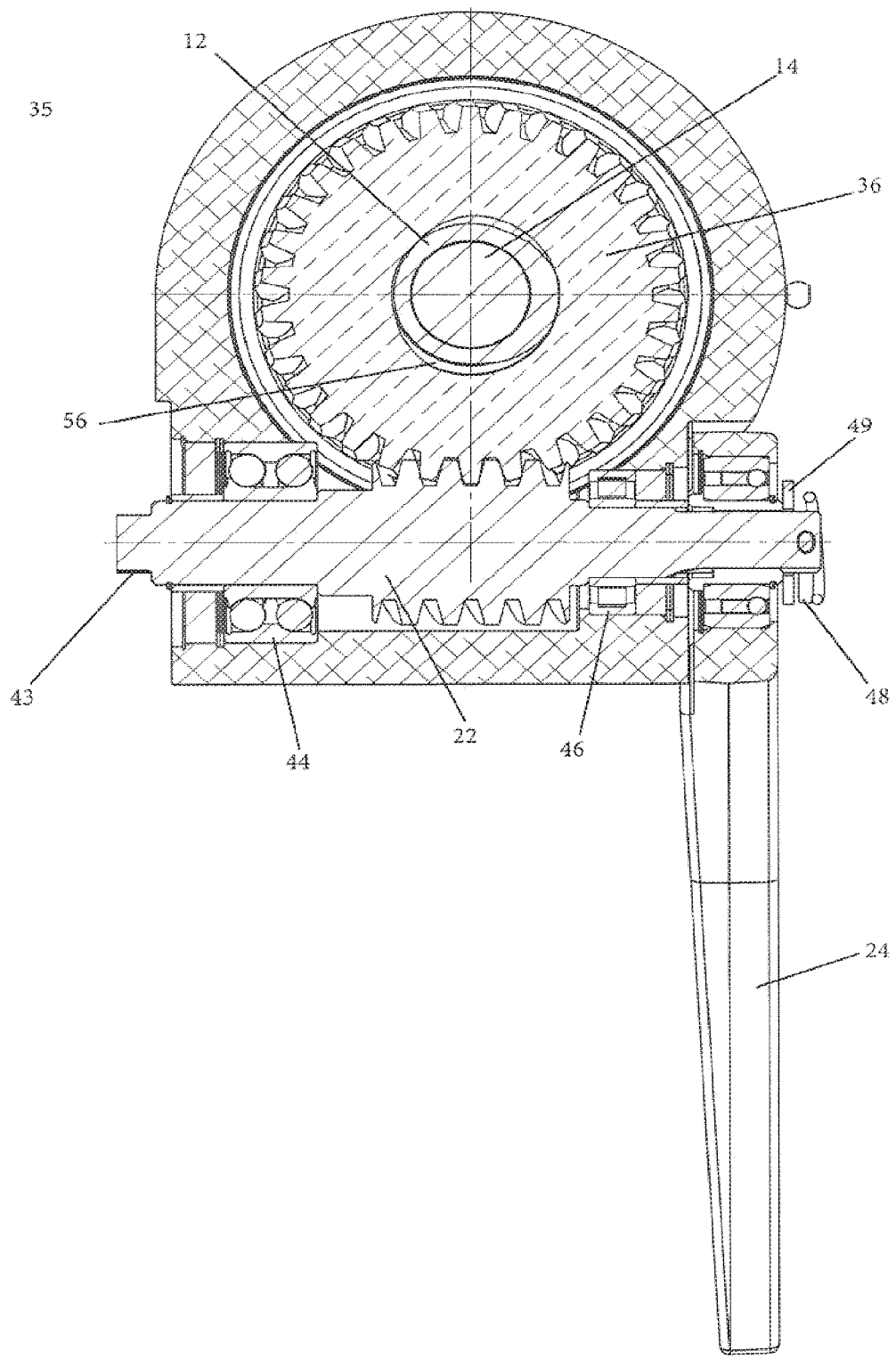
FIG. 9 is a partial, top, cross-section, view, of the embodiment of a rotator shown in FIG. 7, the section plane being through the worm axis and perpendicular to the polished rod axis.
Figure 10:
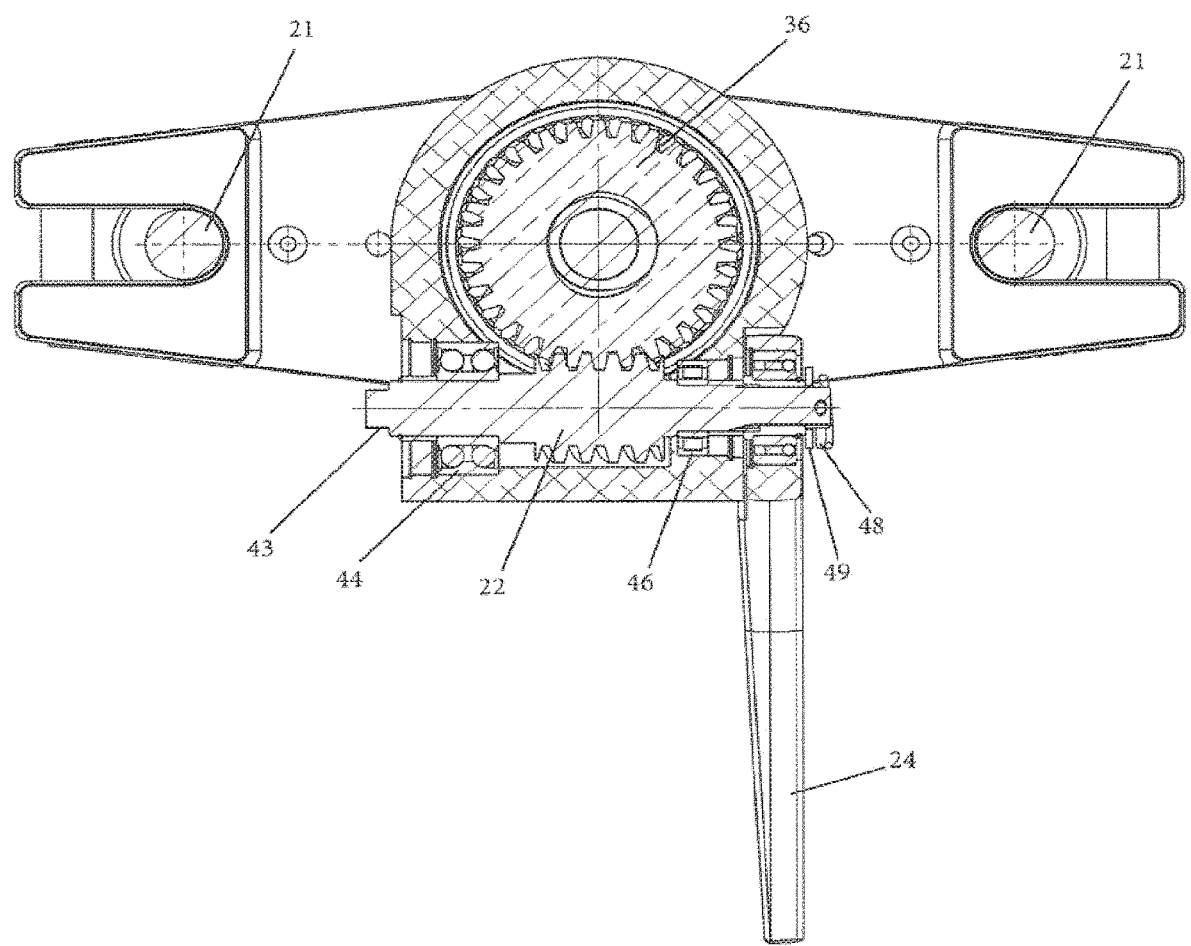
FIG. 10 is a top, cross-section, view, of the embodiment shown in FIG. 7.
Figure 11:
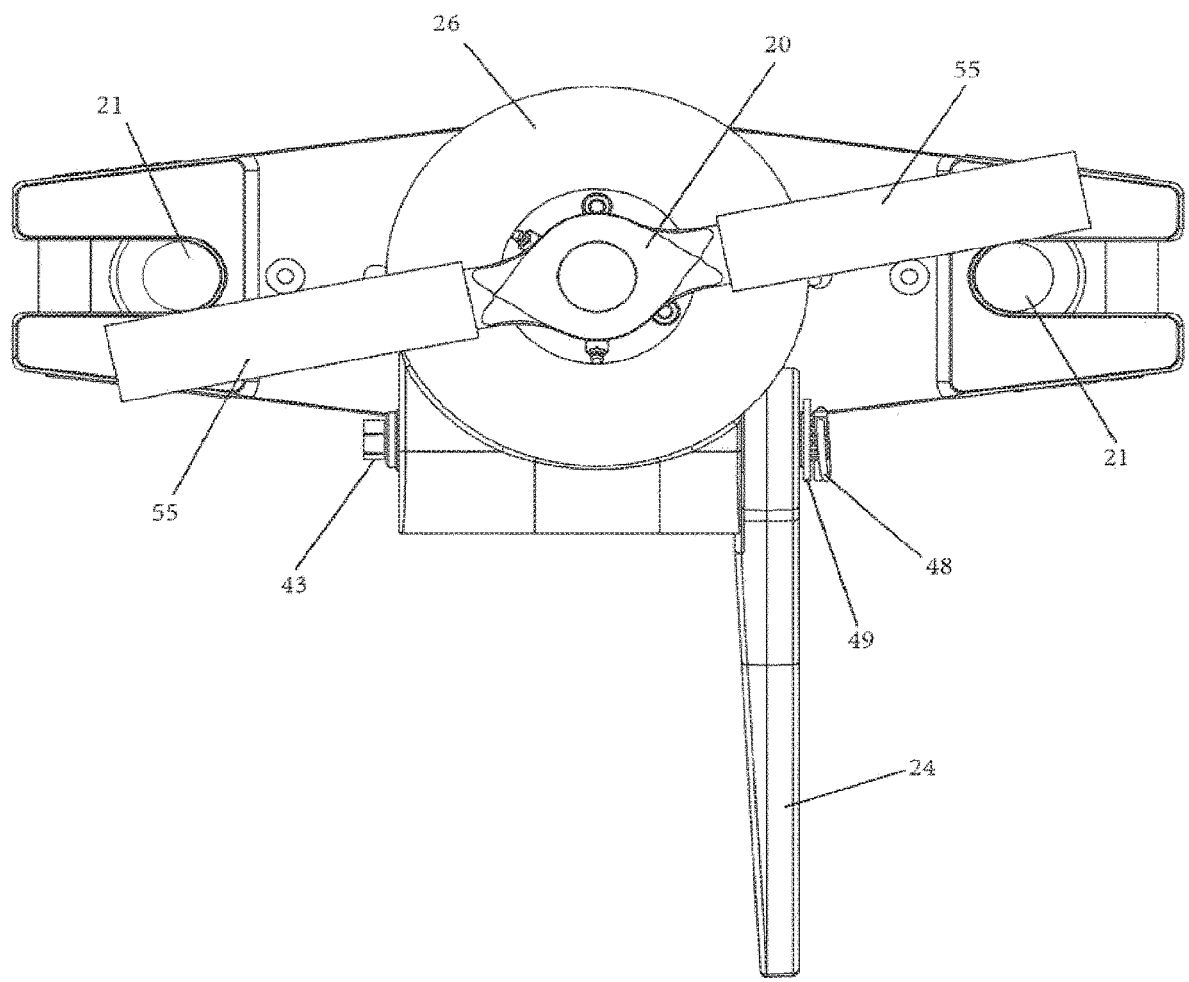
FIG. 11 is a top, plan, view, of the embodiment shown in FIG. 7.
Figure 12:
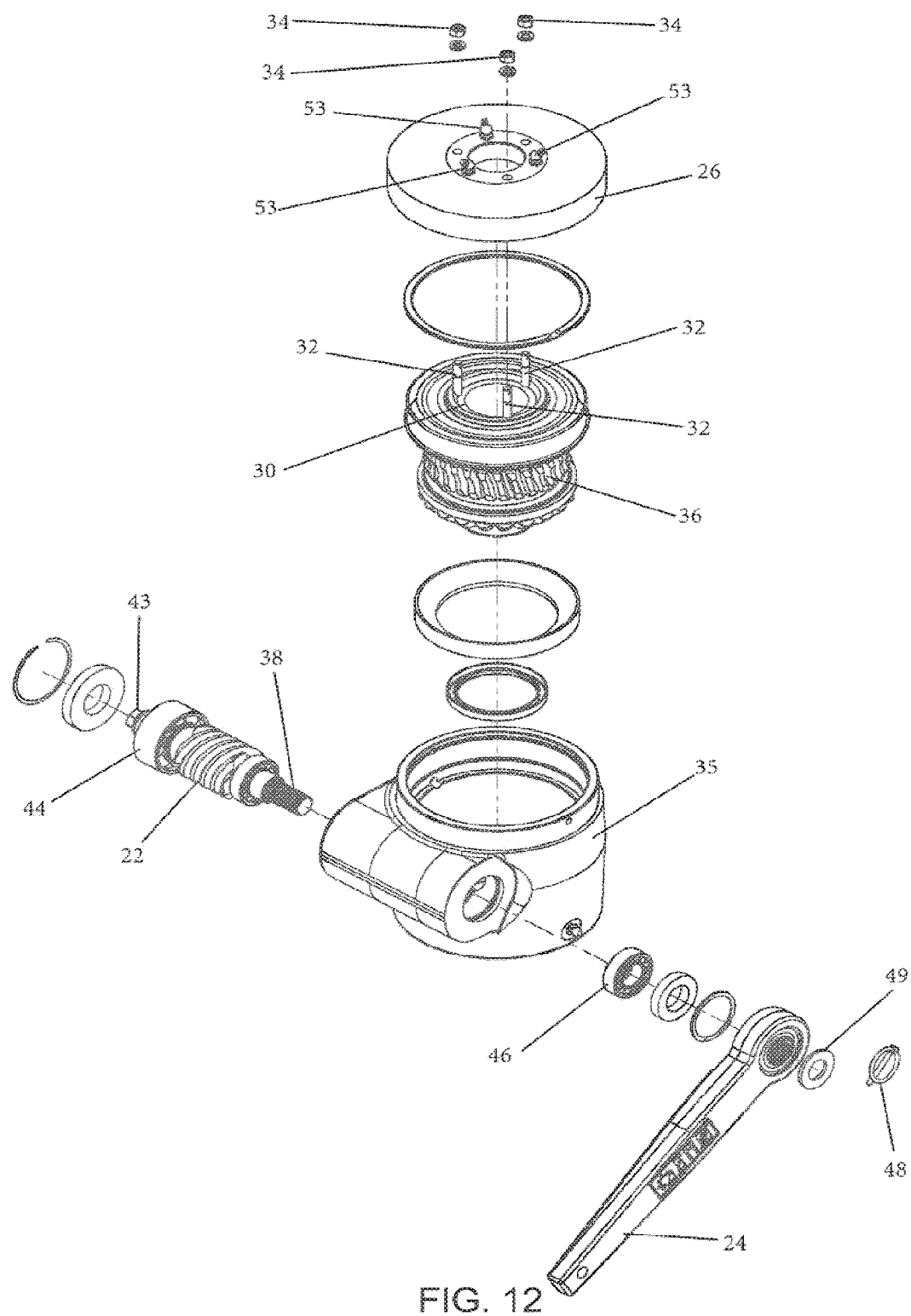
FIG. 12 is an exploded, perspective, view of the embodiment of a rotator shown in FIG. 7 in the absence of the rod and rod carrier.
Figure 13:
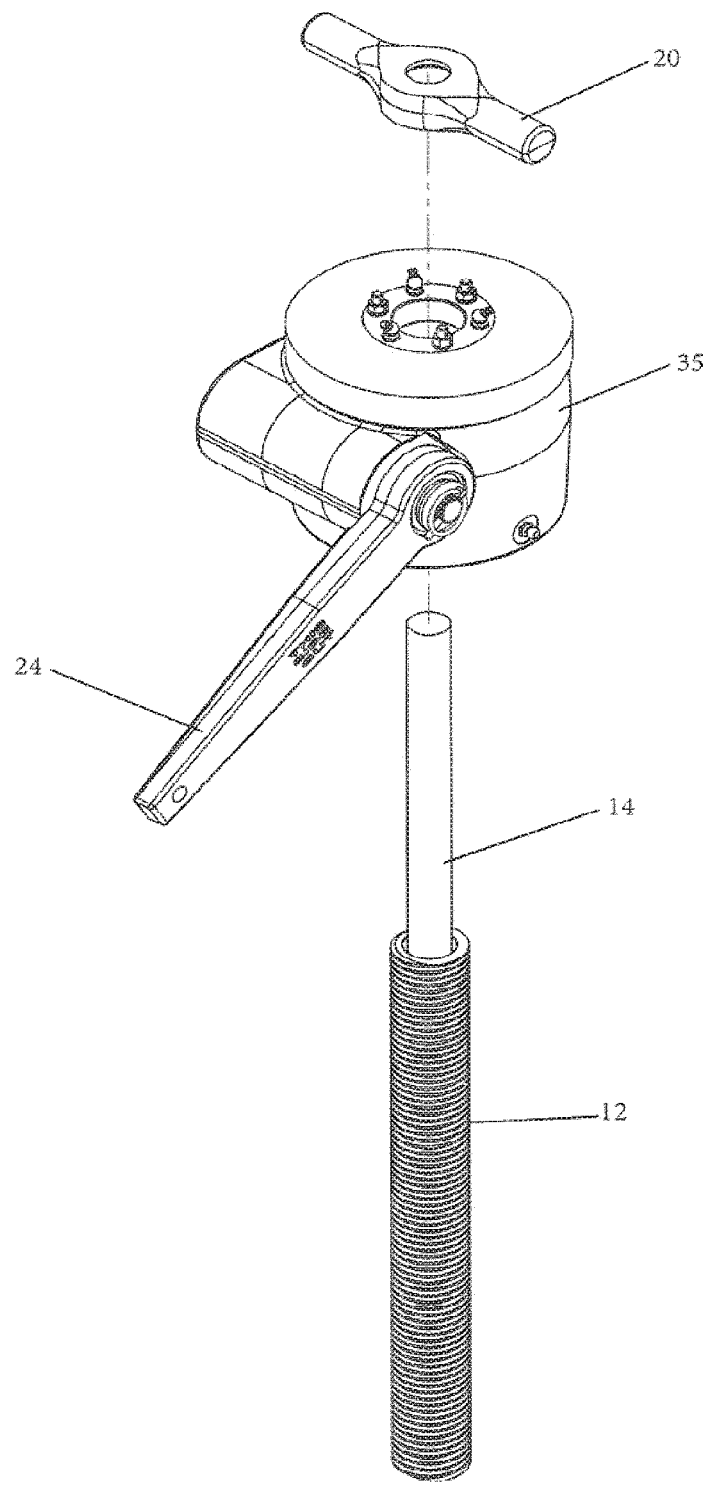
FIG. 13 is a partially exploded, perspective, view of the embodiment shown in FIG. 7, showing the rod and rod carrier.

Referring now to FIG. 6, the polished rod 14 and rod carrier 12 can pass through the rotator 35 in some embodiments such that swinging motion of the lever 24 can result in rotational movement of the polished rod 14. In some embodiments, locking nuts 50, 52 can be engaged with the rod carrier 12 by threads. Clamping the locking nut 50, 52 and taper locks 16, 18 by bolts 54 can prevent unwanted movement of the rod carrier 12 with respect to polish rod 14.

Referring now to FIG. 7 to FIG. 13, further embodiments of apparatus 10 and rotator are shown.

In some embodiments, standard polish rod clamps can be used as main clamp 15 and/or safety clamp 17. Safety clamp 17 can remain stationary and not be moved to provide safety. In the absence of a properly positioned safety clamp 17, and when rod 14 is adjusted upwards, spindle 12 can continue to move upward and if it goes too far, spindle 12 can thread it all the way out of rotator 35. In order to prevent such dethreading, the distance from the lower edge of the main crossbar 23 to top of safety clamp 17, can be set so that safety clamp 17 can butt up against the bottom of the main crossbar 23, prior to the dethreading of spindle 12, when rod 14 and spindle 12 are adjusted upwards. In some embodiments, a distance of five inches can be used, although it would be appreciated that other distances can be used as required.

Further, in some embodiments, cross member 20 can be truncated so as it does not engage support cables 21 directly, but cross member 20 can have arms configured to receive extension members 55, such as pieces of pipe available to the operator, that when disposed on cross member 20, extension members 55 can contact support cables 21. Such contact can then allow for a height adjustment to be made will preventing or reducing rotation.

In some embodiments, a regular, non-angular, bearing assembly 19$^1$ can be used rather than angular contact bearing 19. The bearings and bearing assemblies can be sealed and the cavity can be filled with grease through grease nipples 53. Further, in some embodiments, rotator 35 can be sealed internally and grease nipples 53 can be used to fill in the cavity so the upper cavity is fully filled with grease. A grease outlet can be used with a plug, such that the cavity can be filled with grease to the point that grease comes out of the outlet, and at that point, the plug can be inserted into the outlet. As rotator 35 can be rotating, the grease can be distributed and spread throughout the unit. When bearings 19, 19' and rotator 35 cavities above and under the bearings 19, 19' are full of grease and sealed, traditional rotator contamination problems are ameliorated.

Further, a load cell can be disposed on apparatus 10, in some embodiments, between the body of rotator 35 and crossbar 23. When using prior art apparatuses and methods, an operator preforming a height adjustment has to blindly guess the tap position of the sucker rod hitting bottom. According to the present disclosure, however, the load cell can assist in finding and/or predicting the tap position by converting an input of mechanical force into an electrical output signal which can be read as feed-back. The readings can change due to the weight of the rod and friction. Accordingly, the load cell can be calibrated and readings can be made that reflect the changes in the mechanical input. In operation, one would bring the horsehead down, read the load cell, and in combination with processing or analyzing the load cell and readings thereof, systems and/or methods can be used to predict the tap position so as to prevent damage to downhole equipment.

In some embodiments, the apparatus and methods are capable transmitting rotational movement to the polished rod 14 while offering a convenient and safe method of vertical height adjustment of the sucker rod string.

Initial vertical positioning of the polished rod 14 can be achieved in a manner similar to established practices in the industry. The rotator assembly 35 can be mounted to the polished rod 14 by the means of taper-lock bushings 16, 18 or other traditional methods. In the normal course, the rod carrier, polished rod 14, wheel 36, and main thrust bearing 25, can rotate together, simultaneously, and a vertical height adjustment is not made.

For the purposes of periodic re-adjustments, however, using the apparatuses and methods as described herein, it is no longer necessary to break the connection between the polished rod 14 and the rod carrier 12. In operation, the apparatus 10 can be used to re-adjust the vertical height of the sucker rod string by first releasing the locking nuts 34. Next, in some embodiments, a back-up wrench, spare pipe 55, cross member 20, or other means can be used to prevent rotation of polished rod 14, while wheel 36 and main thrust bearing 25 continue to be free to rotate. To adjust the vertical positioning of polished rod 14, the worm 22 of some embodiments can be rotated in the desired direction, which will depend on a combination of threads used, worm 22 handing, and relative position of the lever 24. If lever 24 is used to adjust the vertical positioning, in some embodiments flipping the lever 24 along its longitudinal axis can determine the direction of rotation.

In some embodiments, optional polished rod one-way clutch 42 can be removed prior to height adjustment and replaced following the height adjustment. To move polished rod 14 up, the operator can work the lever 24. In some embodiments, when worm 22 is rotated in a clockwise direction looking from the right, movement of polished rod 14 will be upwards and can be accomplished with lever 24. To move polished rod 14 down, the opposite end of worm 22 can be worked the other way, for example by using engagement means 43 and ratchet, and worm 22 is rotated in a clockwise direction looking from the left, movement of polished rod 14 will be downwards.

In some embodiments, lever 24 can be removed. Safety pin 48, and washer 49 can be removed and, handle of lever 24 can be slid off. In such embodiments, once pin 48 is removed, then worm 22 is moveable and can be moved in either direction using engagement means on the far end of worm 22. As such, using a socket and ratchet (for example, an air ratchet) on this side, the operator can decide which way to adjust the height.

Without limitations, and for purpose of illustration only, if the worm 22 and rod carrier 12 can be both threaded as "right-hand" and if the worm 22 is rotated clockwise looking at the lever-end as shown in the accompanying figures, the worm-wheel 36 can rotate clockwise looking from above. If rod carrier 12 is prevented from rotating around its axis, for example by the means of cross-member 20, the rod carrier 12 can be forced to move upwards relative to the worm-wheel 36 and the main thrust bearing 25. In a similar manner, if the worm 22 is rotated counter-clock-wise, the rod carrier 12 can be forced to move downwards relative to the worm-wheel 36 and the main thrust bearing 25.

Once a new, desired, vertical position of polished rod 14 has been achieved, locking nuts 34 can be retightened to increase the friction connection between wheel 36 and rod carrier 12 and to prevent unwanted relative movement between the rod carrier 12 and the worm wheel 36. The back-up wrench 20, and/or pipe 55 (if used) can be removed, lever 24 and optional one-way clutch 42 can be brought to original working positions and operation of the pump can be resumed.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

While the above description details certain embodiments of the invention and describes certain embodiments, no matter how detailed the above appears in text, the invention can be practiced in many ways. Details of the apparatuses and methods may vary considerably in their implementation details, while still being encompassed by the invention disclosed herein. These and other changes can be made to the invention in light of the above description.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification. Accordingly, the actual scope of the invention encompasses not only the disclosed embodiments, but also all equivalent ways of practicing or implementing the invention.

The above description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. The elements and acts of the various embodiments described above can be combined to provide further embodiments.

While certain aspects of the invention are presented below in certain claim forms, the inventors contemplate the various aspects of the invention in any number of claim forms.

Accordingly, the inventors reserve the right to add additional claims after filing the application to pursue such additional claim forms for other aspects of the invention.

What is claimed is:

1. An apparatus for rotating and for adjusting the vertical position of a polished rod of a pump, the apparatus comprising:
    a tubular rod carrier for receiving the polished rod therethrough, the rod carrier having external threads;
    a locking mechanism for fixing the rod carrier to the polished rod and a cross member for preventing rotation of the rod carrier and the polished rod; and
    a rotator surrounding the rod carrier, the rotator comprising:
        a wheel having a threaded core for threaded connection with the external threads of the rod carrier, the wheel comprising a worm wheel engaged by a worm; and
        a main thrust bearing for supporting the wheel;
    wherein, when the polished rod rotates freely, rotation of the wheel rotates the rod carrier and the polished rod about its vertical axis,
    wherein, when the polished rod is prevented from rotation, rotation of the wheel relative to the rod carrier results in vertical movement of the rod carrier and the polished rod, and
    wherein the vertical movement occurs without disengaging the locking mechanism for fixing the rod carrier to the polished rod.

2. The apparatus of claim 1 wherein the locking mechanism comprises a taper lock bushing.

3. The apparatus of claim 1 wherein the locking mechanism comprises a polished rod clamp.

4. The apparatus of claim 1, wherein the worm is rotatably actuated.

5. The apparatus of claim 1 wherein the rotator comprises an additional ratchet mechanism positioned proximate an end of the worm.

6. The apparatus of claim 1, wherein the worm comprises a splined worm shaft.

7. A method for rotating and for adjusting the vertical position of a polished rod of a pump, the method comprising:
    providing a tubular rod carrier for receiving the polished rod, the rod carrier being immovably connected to the polished rod and having external threads,
    providing a rotator having a wheel, the wheel being a worm wheel having a threaded core and being engaged by a worm,
    engaging a locking mechanism between the wheel and the rod carrier to rotate the rod carrier and the polished rod,
    wherein rotating the wheel relative to the rod carrier rotates the rod carrier and the polished rod, and
    releasing the locking mechanism between the wheel and the rod carrier and preventing rotation of the polished rod to adjust vertical positioning of the rod carrier and the polished rod, wherein rotation of the wheel threadably engages the threaded core of the wheel with the external threads of the rod carrier to adjust the vertical position of the rod carrier and polished rod; and
    wherein the polished rod and the rod carrier are not separated during the adjustment of the vertical positioning of polished rod.

8. The method of claim 7, wherein:
    adjusting the vertical positioning of the polished rod is accomplished by rotating the worm to rotate the wheel threadably engaged with the rod carrier.

9. The method of claim 8, further comprising:
    disengaging a one-way clutch from the rotator prior to rotating the worm.

10. The method of claim 7, wherein:
    a cross member is used to prevent rotation of the polished rod.

11. The method of claim 7, further comprising:
    re-engaging the locking mechanism between the wheel and the rod carrier once a new, desired, vertical position of polished rod has been achieved.

* * * * *